Aug. 26, 1924.
W. C. STEVENS
1,506,457
PROCESS OF MANUFACTURING TIRE VALVE STEMS
Filed Jan. 16, 1922
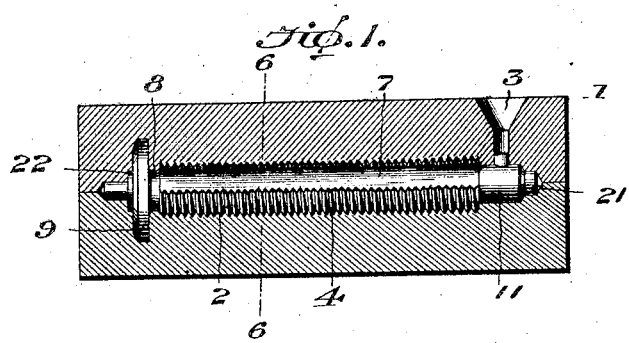
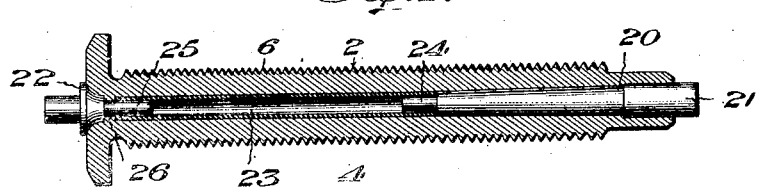
 
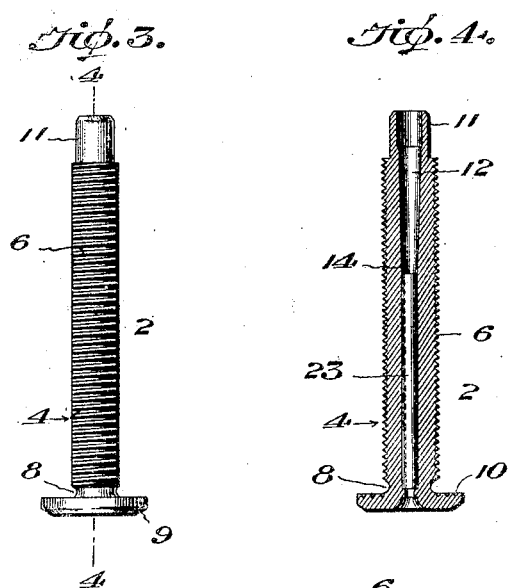 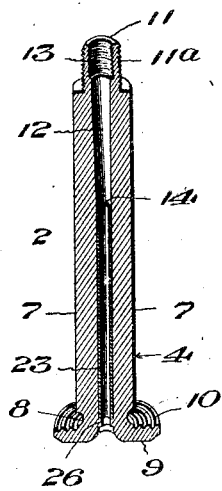
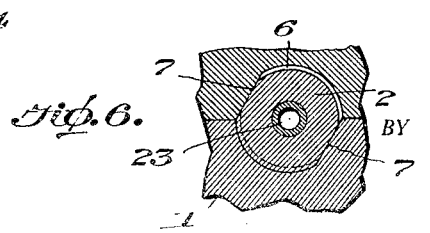
INVENTOR.
William C. Stevens
BY
ATTORNEY.

Patented Aug. 26, 1924.

1,506,457

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

PROCESS OF MANUFACTURING TIRE VALVE STEMS.

Application filed January 16, 1922. Serial No. 529,557.

*To all whom it may concern:*

Be it known that I, WILLIAM C. STEVENS, a citizen of the United States, residing at Akron, in the county of Summit, State of Ohio, have invented certain new and useful Improvements in Processes of Manufacturing Tire Valve Stems, of which the following is a specification.

This invention relates to the manufacture of small metal articles of aluminum or similar metal which are die-cast the invention being particularly adapted to the art of forming valve stems for pneumatic tires by a die casting operation, which is supplemented by machine operations of certain portions, which cannot be so well done by the die-casting or which it is advisable to do by a machining operation.

Heretofore these parts have been manufactured on screw-machines, necessitating the construction and maintenance of expensive machinery and the employment of a high-class of labor on the work. It is the purpose of my present invention to substitute for the machinery operation the less expensive die-casting operation so as to reduce the cost of manufacture and improve upon and simplify it.

In the specification and drawings of this application, there are shown several steps in the manufacture of this article by the die casting method, it being understood that the showing is illustrative merely and may be varied in accordance with any practice, so long as the essential features of my invention are retained.

In the drawings:

Fig. 1 is a sectional view of a die-casting mold with a partially formed valve stem therein.

Fig. 2 is an enlarged longitudinal cross section of a valve stem.

Fig. 3 is an elevation of a valve stem as it comes from the mold.

Fig. 4 is a longitudinal section showing a partially completed valve stem.

Fig. 5 is a perspective view of a completed valve stem which is cut away to illustrate the internal construction.

Fig. 6 is a section through the mold and valve stem on the line 6—6 of Fig. 1.

The mold to manufacture the valve is indicated at 1 in Fig. 1 and being in two halves enclosing the molding cavity. The valve stem blank is indicated by the numeral 2 and the sprue hole by the numeral 3.

The ordinary or standard form of valve stem is provided with an elongated barrel 4, the outer surface of which, over the largest portion of its length is provided with screw threads 6 and with flattened areas 7 on opposite sides. At the base of the valve stem is formed a recess 8 about the stem in which the tire tube seats and a foot 9 which is located within the tire tube and is provided with a series of concentric grooves 10 to pinch the tube by the ordinary nut. The outer end of the stem is formed with a reduced nipple 11 which is screw threaded as at $11^a$ on the outside to receive the usual valve cap. The interior of the valve stem is hollowed out to provide a passageway 12 for the air, the inside of the nipple being screw-threaded as at 13 to receive the plug forming a part of the "valve insides." Within the passageway there is usually provided a ledge or shoulder, on which the small foot at the lower portion of the "insides" comes to rest, to compress the spring. This ledge or shoulder is shown at 14.

In die-casting the valve stem the parts are formed by the contour of the mold, as shown in Figs. 1 and 2, with the screw threads 6 and the flattened portions 7 on the major portion or barrel of the stem, the foot 9, without the concentric grooves 10 and the nipple 11 as a plain or smooth extension. The flattened portions 7 lend themselves readily to the die casting operation, as the mold may be formed as shown in Fig. 6, with the valve stem turned so that each half carries a complete flattened portion 7, and the complementary screw-threaded portion 6. In this manner the burr occasioned by the crack between the mold halves comes at the line where the flattened portion meets a screw-threaded portion and can be ground or dressed off leaving sharp points at the threads.

The upper portion of the passageway 12 is formed by a core 20 which tapers down to the ledge 14 the outer end of the core being slightly enlarged at 21 to form the socket for the plug on the insides. I have shown this enlarged end as smooth or plain, but it is possible to provide screw-threaded formations on the plug to form the corresponding threads 13 on the interior of the nipple.

The lowermost end of the passageway is formed by a core 22 which projects a short distance into the mold cavity.

The remainder of the passageway is formed by a metal tube 23, which is held on reduced extensions 24 and 25 on the cores 20 and 22 respectively. The tube 23 is intended to be retained permanently in the valve stem, the upper edge of the tube forming the shoulder 14. At the lower end of the tube a slight gap is permitted between it and the body of the core 22 so that the metal flows around the lower end of the tube forming a ledge or rib 26 that serves to prevent the tube 23 from falling into the tire tube.

When the casting of the valve stem is completed the cores 20 and 22 are removed and the only operations left to be performed are the removal of the burrs and sprue, and the forming of the screw-threads 11ª and 13, if a screw-threaded plug 21 is not used, and the formation of the grooves 10. The formation of the screw-threads 11ª and 13 and the grooves 10 may be done in any suitable manner as found convenient.

It will be seen that there is disclosed herein a new and improved method of manufacturing valve-stems, which presents a quicker and more economical procedure in the manufacture of this article than was possible in the prior methods of manufacture. The several steps are subject to such modifications as would suggest themselves to one skilled in the art, the purpose of the present disclosure being to enable the process to be carried out by such a person, and is not intended to limit the invention beyond the fair scope of the appended claims.

The valve stem which is produced by the method, being a new article of manufacture is the subject of my copending application, Serial No. 529,558 filed January 16, 1922.

Claims:

1. The process of manufacturing valve stems of the usual form for pneumatic tires, comprising die-casting a stem with screw-threads over the major portion thereof and with oppositely positioned flattened areas, forming the central air-passageway by means of removable cores and a supplementary tube, permitting the tube to remain in the valve stem as a permanent portion thereof.

2. The process of manufacturing valve stems of the usual form, for pneumatic tires, comprising die-casting a stem with the barrel thereof in its completed shape, forming the central air-passageway by means of removable cores entering from both ends of the valve stems and by a supplementary tube extending between the ends of the cores, and after the casting operation removing the cores and leaving the tube within the valve stem as a permanent part thereof.

3. The process of manufacturing valve stems of the usual form for pneumatic tires, comprising the steps of casting a stem from metal with the barrel thereof in its completed shape, forming the central air-passageway by means of removable cores entering from both ends of the valve stem, and by a metal tube extending between the ends of the core, confining the tube so as to prevent its displacement, and after the casting operation removing the cores and leaving the tube within the valve stem as a permanent part thereof.

4. The process of manufacturing valve stems of the usual form for pneumatic tires, comprising the steps of casting a stem from metal with the barrel thereof provided with screw-threads and flattened areas, and forming the central air-passageway by means of a removable core and a metal tube arranged in line.

5. The process of manufacturing valve stems of the usual form for pneumatic tires, comprising the steps of casting a stem from metal with the barrel thereof in its finished condition and with a smooth nipple and an air-passageway through the axis of the stem, and after the casting operation, forming the threads on the nipple by a mechanical operation.

6. The process of manufacturing valve stems of the usual form for pneumatic tires, comprising the steps of casting a stem from metal with the barrel thereof in its finished condition and with a smooth nipple and foot, and an air-passageway through the axis of the stem, and after the casting operation forming the threads on the nipple and grooves on the foot by mechanical operation.

7. The process of manufacturing valve stems of the usual form for pneumatic tires, comprising the steps of providing a mold with a cavity corresponding to the outer surface of the valve stem and with smooth extensions to form the nipple and the foot, mounting a metal tube within the cavity on cores entering from both ends, casting the metal around the cores and tube, confining the tube within the stem and after the casting operation forming the threads on the nipple and the grooves on the foot by mechanical operations.

WILLIAM C. STEVENS.